(12) United States Patent
Clark et al.

(10) Patent No.: US 12,227,351 B1
(45) Date of Patent: Feb. 18, 2025

(54) REUSABLE CARTRIDGE BASED SYSTEM FOR PRECISION PLACEMENT OF CONSTRUCTION MATERIALS

(71) Applicant: Diamond Age 3D, Inc., Phoenix, AZ (US)

(72) Inventors: Paul Clark, Gilbert, AZ (US); Philip Mutarelli, Fremont, CA (US); Adam Hoch, San Jose, CA (US); Jonathan Reiland, Phoenix, AZ (US); Russell Varone, Phoenix, AZ (US)

(73) Assignee: Diamond Age 3D, Inc., Phoenix, AZ (US)

( * ) Notice: Subject to any disclaimer, the term of this patent is extended or adjusted under 35 U.S.C. 154(b) by 231 days.

(21) Appl. No.: 18/053,710

(22) Filed: Nov. 8, 2022

Related U.S. Application Data

(60) Provisional application No. 63/277,136, filed on Nov. 8, 2021.

(51) Int. Cl.
*B65D 83/00* (2006.01)
*B33Y 30/00* (2015.01)
*B33Y 50/00* (2015.01)

(52) U.S. Cl.
CPC .......... *B65D 83/0022* (2013.01); *B33Y 30/00* (2014.12); *B33Y 50/00* (2014.12)

(58) Field of Classification Search
CPC ...... B65D 83/0022; B33Y 30/00; B33Y 50/00
USPC ................................ 222/326, 340, 389, 390
See application file for complete search history.

(56) References Cited

U.S. PATENT DOCUMENTS

| | | | | |
|---|---|---|---|---|
| 976,945 A * | 11/1910 | Stone, Jr. | ........... | B65D 83/0011 184/38.4 |
| 1,709,445 A * | 4/1929 | Tomes | ........... | B05C 17/015 222/326 |
| 1,965,271 A * | 7/1934 | Wharton | ........... | F16N 37/02 222/95 |
| 4,742,941 A * | 5/1988 | Tastet | ........... | A21C 5/02 425/238 |
| 5,046,642 A * | 9/1991 | Cathcart, Sr. | ........... | B05C 17/0103 222/326 |
| 5,246,144 A * | 9/1993 | Cathcart, Sr. | ........... | B05C 17/0136 222/326 |
| 5,353,971 A * | 10/1994 | Vaziri | ........... | B05C 17/0103 222/326 |
| 5,452,824 A * | 9/1995 | Danek | ........... | B05C 11/1034 222/327 |
| 6,223,941 B1 * | 5/2001 | Nealey | ........... | B05C 17/015 222/105 |

(Continued)

*Primary Examiner* — Paul R Durand
*Assistant Examiner* — Michael J. Melaragno
(74) *Attorney, Agent, or Firm* — Cooley LLP

(57) ABSTRACT

An apparatus has a cartridge utilized to contain a volume of construction material. A piston is inserted into the cartridge under operable control by at least one plunger assembly. A forming device is removably mounted to the cartridge opposite to the piston. A loading assembly is engaged to the cartridge to sequentially insert the volume of construction material and the piston into the cartridge. At least one sensor package is oriented towards the cartridge to capture at least one condition datum from the volume of construction material. A unitary controller receives and processes the condition datum to supply control signals to the plunger assembly and the loading assembly based on historical condition data.

5 Claims, 8 Drawing Sheets

(56) References Cited

U.S. PATENT DOCUMENTS

| | | | | |
|---|---|---|---|---|
| 7,476,097 B1* | 1/2009 | Mangelsen | ............ | B29C 48/02 |
| | | | | 222/391 |
| 8,322,907 B2* | 12/2012 | Amurri | ................. | B29C 48/92 |
| | | | | 366/156.2 |
| 2003/0080152 A1* | 5/2003 | Balcome | .......... | B05C 17/00553 |
| | | | | 222/326 |
| 2005/0230432 A1* | 10/2005 | Jorgenson | ........... | E04F 21/1652 |
| | | | | 222/389 |
| 2005/0269368 A1* | 12/2005 | Proulx | ................. | G01F 11/288 |
| | | | | 222/326 |
| 2009/0272767 A1* | 11/2009 | Herman | ........... | B05C 17/00583 |
| | | | | 222/326 |
| 2013/0020350 A1* | 1/2013 | Gardos | ................... | A01M 3/00 |
| | | | | 222/113 |
| 2014/0197198 A1* | 7/2014 | Paetow | ............ | B05C 17/00596 |
| | | | | 222/212 |
| 2015/0069083 A1* | 3/2015 | Alekseyev | ............... | H02P 7/08 |
| | | | | 222/23 |
| 2015/0083751 A1* | 3/2015 | Aigner | ............. | B05C 17/00553 |
| | | | | 222/326 |

* cited by examiner

REUSABLE CARTRIDGE BASED SYSTEM FOR PRECISION PLACEMENT OF CONSTRUCTION MATERIALS

CROSS-REFERENCE TO RELATED APPLICATION

This application claims priority to U.S. Provisional Patent Application No. 63/277,136, filed Nov. 8, 2021, the contents of which are incorporated herein by reference.

FIELD OF THE INVENTION

The present invention relates generally to tools for handling and containing construction materials for use in an iterative building process. More specifically, the present invention compartmentalizes and deploys admixture construction material as part of a quality-control system.

DESCRIPTION OF BACKGROUND ART

In large scale construction three-dimensional (3D) printing methods, a large format 3D positioning system moves a print head across the print envelope while dispensing a low viscosity material used to form structures such as walls and partitions.

In present state of the art applications, the material is pumped through a series of hoses and is directly applied to the structure, or the material is deposited in a collection chamber or hopper and a secondary motive means (such as an auger, screw or similar device) pushes the material onto the structure through a shaped forming nozzle. These pumping systems combined with material viscosity constraints make utilizing larger fillers, fibers, or aggregates difficult in continuous systems.

This process typically is performed in manner where the semi-fluid, low viscosity material is spread as to form a wall or wythe or layer while a motion control system moves the application head in a manner that leaves a relatively uniform profile of material, forming a layer. As the material is semi-fluid, starting and stopping the process is done infrequently and layers are deposited in a near continuous manner.

Applying material in such a manner requires pathing and wall layout that resemble a nearly continuous path or trace, where changes in direction are often formed by using a closed profile curve or arc. This presents difficulties in forming corners and shapes where intersecting segments are predominantly orthogonal in nature.

Thus, there is a need to address deficiencies associated with prior art systems.

SUMMARY

An apparatus has a cartridge utilized to contain a volume of construction material. A piston is inserted into the cartridge under operable control by at least one plunger assembly. A forming device is removably mounted to the cartridge opposite to the piston. A loading assembly is engaged to the cartridge to sequentially insert the volume of construction material and the piston into the cartridge. At least one sensor package is oriented towards the cartridge to capture at least one condition datum from the volume of construction material. A unitary controller receives and processes the condition datum to supply control signals to the plunger assembly and the loading assembly based on historical condition data.

DETAILED DESCRIPTION

Figure 1:
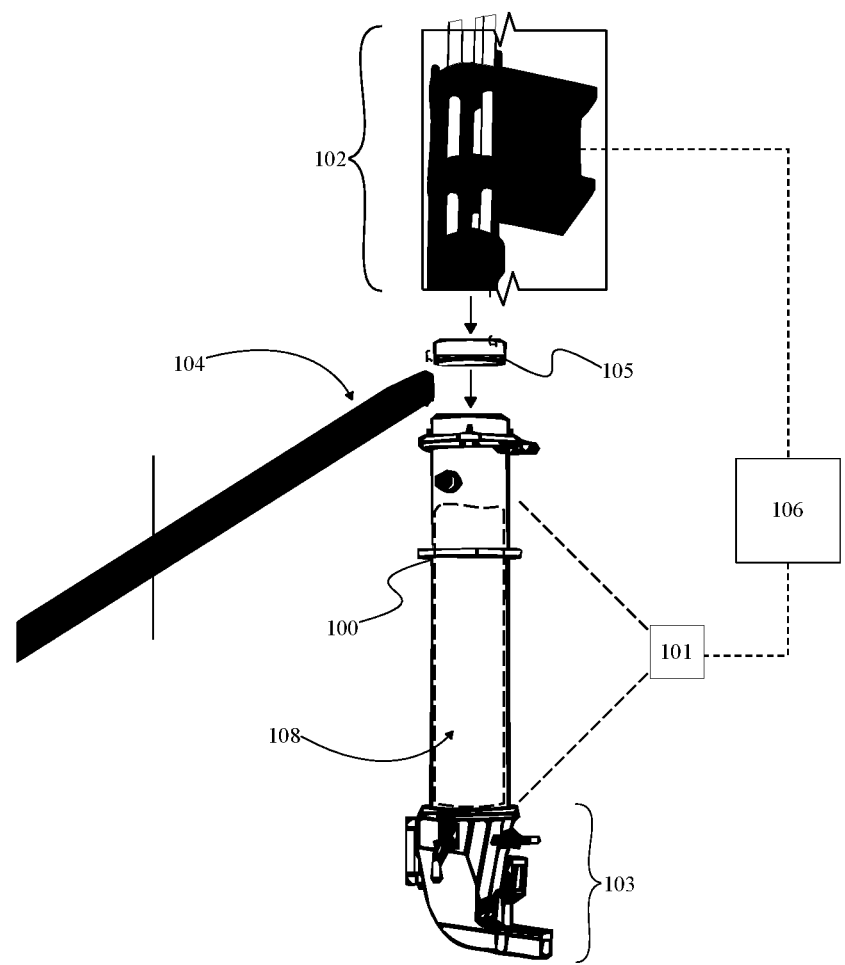
FIG. 1 is an elevational view of the present invention, where the operable components are arranged in a general approximation of a normal functional order.

FIG. 1 illustrates an exemplary format of the present invention, indicating a cartridge 100 configured to receive a volume of construction material 108. A piston 105 is positioned into the cartridge 100 to constrain and compress the volume of construction material 108 therein, propelling the volume of construction material 108 within the cartridge 100 under operative force provided by an external plunger assembly 102. The volume of construction material 108 is propelled ahead of the piston 105 into a forming device 103 terminally mounted to the cartridge 100 opposite the piston 105. A loading assembly 104 if further provided to receive and engage the cartridge 100, wherein the loading assembly 104 is configured to sequentially dispose the volume of construction material 108 into the cartridge 100 ahead of the piston 105. The present invention is additionally provided with at least one sensor package 101 oriented towards or operatively engaged to the volume of construction material 108. Condition data is derived from the volume of construction material 108 using the sensor package 101, ideally enabling successive instances of the volume of construction material 108 to be iteratively improved by adjusting deterministic mixture metrics and controlling for ambient conditions. In support of this functionality, a unitary controller 106 is connected to the sensor package 101, the plunger assembly 102, and the loading assembly 104 such that the unitary controller 106 supplies control signals to the plunger assembly 102 and the loading assembly 104 based on the condition data.

The cartridge 100 broadly refers to a durable container suitable for repeated use within an automated construction process, specifically configured to contain an extrudable mass of structural material in an uncured, flexible, noncatalyzed, or semifluid state. The cartridge 100 is further considered to be variable within a single instance of the present invention, ideally to support the use of disparate materials, adhesives, sealants, and other extrudable materials as may be required to automate various construction processes familiar to a person of ordinary skill. In one instance, the cartridge 100 may vary in size and internal volume to support extended or truncated deposition processes between reloads. In another instance, the cartridge 100 may be configured as a carrier for a secondary sealed container, wherein the secondary container is used as a transitory package for the volume of construction material 108.

The sealable quality of the cartridge 100 may further be configured for extended transport between a mix-site and the construction area, reducing the need for on-site mixing and additive-measurement equipment. This compartmentalization enables a single mixer-cell of increased capacity to service multiple sites simultaneously, rather than the conventional requirement of discrete mixer-apparatuses being positioned on-site to directly feed construction material to a pumped-extruder.

Commensurate with the various embodiments of the cartridge 100, the volume of construction material 108 may comprise any type, combination, or admixture of extrudable or sprayable material that may be controllably deployed in support of an automated construction process. The volume of construction material 108 is ideally a cementitious admixture calibrated for optimal performance based on the condition datum, such that each volume of construction material 108 contained in each successively deployed cartridge 100 represents a material, iterative improvement upon previously deployed instances.

Further, it is considered that each volume of construction material 108 loaded into the cartridge 100 may utilize of large-diameter aggregate, additives, fibrous reinforcement, and other mass-fill additives that are not conventionally dispensable using a continuous pump system. This availability enhances the overall range of corrective actions that may be applied to each volume of construction material 108, in addition to improving the potential range of finished qualities thereof.

The piston 105 defines an adjustable cap, diaphragm, or other containment structure configured to enclose the volume of construction material 108 into the cartridge 100. The piston 105 is further configured to maintain a controlled environment within the cartridge 100 in conjunction with the forming device 103, such that the plunger assembly 102 may act upon the piston 105 to displace the volume of construction material 108 along the internal volume of the cartridge 100.

Accordingly, the plunger assembly 102 constitutes any means of advancing the piston 105 to constrict the available space within the cartridge 100. The plunger system is ideally a ball-screw linear actuator configured for precise application of force along the cartridge 100 based on the applied torque of the actuator motor, such that the plunger assembly 102 may gradually pressurize the cartridge 100 without overstraining the actuator mechanism. The preferred embodiment also enables the applied torque to be reapplied as another data point for optimizing the mixture of the volume of construction material 108 in successive applications, whereby the momentary viscosity of the volume of construction material 108 is derived from the required torque to compress a given mass of material.

The forming device 103 constitutes a means of extruding, shaping, or otherwise directing the volume of construction material 108 upon exiting the cartridge 100. According to the various embodiments described above, the forming device 103 may define any type of spray-nozzle, die, slipform, trowel, screed, or other material-forming tool suitable for the corresponding type of the volume of construction material 108.

Figure 2:
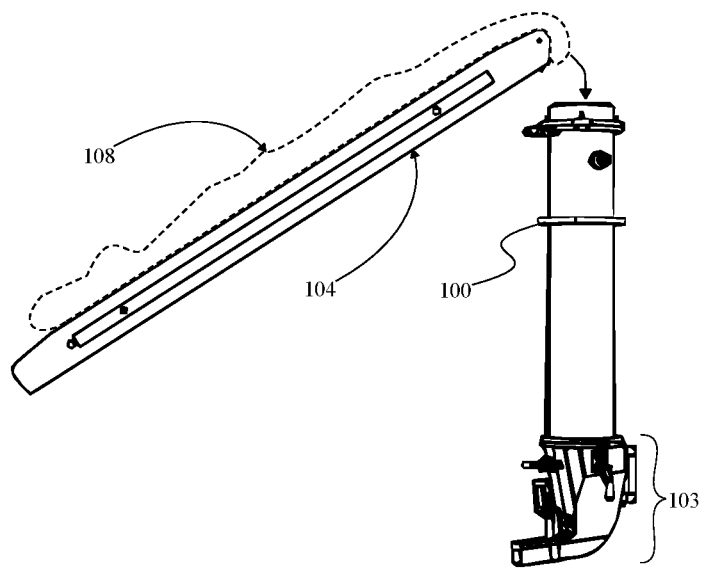
FIG. 2 is a simplified elevational view of the present invention, where an exemplary embodiment of the loading assembly is shown conveying the volume of construction material into the cartridge.

In reference to FIG. 2, the loading assembly 104 refers to any means of replenishing the volume of construction material 108 available for use in each material deposition process. In the exemplary embodiment shown, the loading assembly 104 is a conveyor dispensing the volume of construction material 108 directly into the cartridge 100. In various alternate embodiments, the loading assembly 104 may constitute a pumped-fluid system, including fully contained pressurization systems for aerosol products and the like. In other embodiments, the loading assembly 104 may define a means of exchanging the cartridge 100 whole, including the volume of construction material 108 therein. This embodiment includes a means of introducing new instances of the cartridge 100 for use. It is further proposed that the cartridge 100 may be recycled or reconditioned with the loading assembly 104 in addition to the more conventional reloading operation outlined above, whereby cartridge 100 and forming device 103 may be circulated through the loading assembly 104 continuously as fresh measures of the volume of construction material 108 are provided.

It is understood that a variety of data types may be relevant to the proper preparation and application of the volume of construction material 108 in all its forms. Accordingly, it is proposed that at least one sensor package 101 is configured to acquire a broad range of data sets. Data such as material temperature, ambient temperature, loaded mass, moisture content, ambient humidity, sunlight exposure and intensity, and any other data points relevant to the proper deployment of the volume of construction material 108 may be collected and utilized to iteratively improve the deployment of the volume of construction material 108.

The unitary controlled constitutes a combination of processing units and motor controllers suitable for moderating the operation of the present invention based on user input, pre-programmed processes, and feedback from the various interconnected components of the present invention. Ideally, the unitary controller 106 enables the continuous reapplication of the condition data as the basis for iterative improvements to successive applications of the volume of construction material 108. More specifically, the unitary controller 106 is used to actively monitor and adjust the deployment of each cartridge 100 using at least one condition datum recorded during the preceding deployments. Using this arrangement, each cartridge 100 is controlled and adjusted as a discrete generation in an evolutionary feedback process, thereby allowing for more precise control of variables than may be possible with a continuously pumped or bulk-mixed means of preparing and deploying the volume of construction material 108.

It is proposed that this pattern of iterative improvement is uniquely enabled by modifying the batch-mixture of each volume of construction material 108. This is, in turn, enabled by the discrete compartmentalization of each unique batch to each successive instance of the cartridge 100.

This iterative improvement is accomplished by categorizing desirable material qualities and outcomes as separate from historically observed material metrics and real-time observational data. For example, the contents of each cartridge 100 may be monitored and retraced for quality control with a greater degree of data-discretion compared to conventional systems. In conventional admixture systems, additive quantities in a continuously pumped process may only be estimated at point-of-use (at the extrusion) based on total additives introduced to the system overall. Sequestering each load into each discrete cartridge 100 enables a controlled value to be determined for individual additives and composites included within each instance of the volume of construction material 108, thereby enabling an operator to engage in a recursive self-improvement process for quality control.

A target material value is characterized by external input to the unitary controller 106 to define an as-yet unrealized quality of the volume of construction material 108. The content of this data set may be directly input by an operator but is more directly considered to comprise a data set generated as part of a recursive improvement process, i.e., the target material value is determined using the outcomes observed from the use of previous instances of the target material value. The target material value may define a desired finished strength of the volume of construction material 108 or may establish parameters for coverage and fidelity to a deposition plan. Across all conceivable embodiments, the target material value may constitute any metric by which an ideal deployment of the volume of construction material 108 may be defined.

At least one stored material value is also recorded within the unitary controller 106 corresponding to the condition data of a preceding instance of the volume of construction material 108. A current material value is also captured and characterized by the condition data of the volume of construction material 108 currently in-use or otherwise positioned within the cartridge 100. Aggregation of these data points enables the current material value to be compared to at least one stored material value to derive a material value projection. The material value projection ideally constitutes a trend-line indicating the foreseeable outcomes of the volume of construction data utilizing the current material value. Accordingly, the current material value is ideally adjusted until the material value projection intersects the target material value. This functional pattern ideally reduces the difference between the target material value and the current material value in successive generations, thus enabling the present invention to improve the overall output quality of each volume of construction material 108 contained within each successive cartridge 100.

In one embodiment, the present invention may be configured to adapt the loaded mass of the volume of construction material 108 to accommodate programmed deposition processes of greater and lesser length. More specifically, the control signals relayed to the load assembly indicating the amount of material to be loaded may be iteratively adjusted to accurately reflect the expended material in any given operation, such as the volume of construction material 108 corresponding to an equivalent length of printed cementitious material with minimal wastage. In this instance, the target material value is configured as a minimum load value relating to the volume of construction material 108 expected to be expended for a discrete programmed deposition process. The stored material value is characterized as the recorded expended mass of any preceding volume of construction material 108, inclusive of the mass remaining after completion of the programmed operations. It is generally considered that the stored material value in this instance may be negative, i.e., the recorded expenditure may be insufficient to complete the programmed process. Both oversupply and under-supply is to be avoided, such that the current material value is characterized by the mass of the current volume of construction material 108 being positioned into the cartridge 100. According to the above-outlined iterative correction functionality, the current material value is adjusted to match the projected material value. In this instance, the mass of the currently loaded volume of construction material 108 is adjusted to match the expected expenditure represented by the target material value and informed by the historical expenditures represented by at least one stored material value.

In another embodiment, the handling time and working time of the volume of construction material 108 within the cartridge 100 may be adapted to accommodate extended deposition processes. Further, the working time of the volume of construction material 108 may be adjusted by mixture to counteract environmental factors that reduce working time (heat, sunlight, aridity, etc.) and increase cure time (cold, humidity, darkness, etc.). In this instance, the target material is represented by an optimal cure-time defined by the interval between the insertion of the volume of construction material 108 into the cartridge 100 and the completion of the programmed deposition process using cartridge 100. This target material value may be adjusted to counteract ambient conditions as part of a quality-control system but may also be utilized to accelerate the cure of the volume of construction material 108 to shorten process cycles wherever possible to reduce overall process time. The stored material value relates to accumulated data recorded from previous working-times of preceding instances of the volume of construction material 108, including iterations wherein the duration of the programmed deposition process exceeded the working time of the volume of construction material 108, generally resulting in material jamming and clogging within the forming device 103. In this embodiment, at least one stored material value may additionally be characterized by a delayed set-time resulting in the volume of construction material 108 slumping, sloughing, or deforming after ejection from the forming device 103. This instance of at least one stored material value may involve observation of the volume of construction material 108 deployed in-situ, specifically relating to a post-extrusion assessment of the volume of construction material 108. The current material value is thus characterized by the mass or value of any catalyst additive configured to moderate the set-rate of the volume of construction material 108 by a known timescale. It is considered that adjusting the amount of accelerant in the volume of construction material 108 by the moderation of the current material value in this manner enables successive instances of the volume of construction material 108 to be tuned for optimal working time. This optimization accounts for the parallel requirements for a long working-time to prevent setting in the cartridge 100 and forming device 103 and a suitably rapid structuration rate to maintain integrity after exiting the forming device 103.

It is further understood that the ambient humidity, including the moisture content of any substrate deployment surfaces, may affect the structure and adhesion quality of the volume of construction material 108. Specifically, cementitious materials are understood to shrink and crack if not properly hydrated during the curing process, compromising the finished structure. Likewise, paints and sealants are typically contraindicated for use in high-humidity areas due to a prevalence of surface defects (e.g., fisheyes, lifting, and wrinkling) and a general lack of adhesion to over-wet surfaces. In at least one embodiment, the target material may be characterized by an optimum mixture value for the volume of construction material 108, such that the moisture content therein is adjusted to account for exceedingly wet or dry ambient conditions. Further, at least one stored material value is characterized by the moisture content of the volume of construction material 108 previously deployed from the forming device 103. This instance of the stored material value ideally includes a routine sampling of the moisture content of the volume of construction during all stages of cure, presuming that excessive drying or saturation during any stage may produce undesirable results. The current material value is characterized by the momentary moisture content of the volume of construction material 108 being deployed with the cartridge 100 at any given moment, such that the volume of construction material 108 may be saturated or desiccated in inverse proportion to the ambient conditions in any given construction site or deployment environment.

Controlling for these factors, and accurately deploying the modified mixtures in a timely manner, requires a significant degree of control over the overall mixing and loading procedure. It is thus proposed that the routine exchange of the cartridge 100, including the preparation of a new instance of the cartridge 100, may be performed utilizing a mechatronic solution wherein each discrete process involved in reconditioning a cartridge 100 may be subdivided and tasked to separate areas-of-responsibility corresponding to the requisite tools and materials required for each step. In one embodiment, the loading assembly 104 further comprises a reconditioning platform, a fill platform, and a deployment platform distributed about at least one load manipulator. The fill platform is positioned between the reconditioning platform and the deployment platform to facilitate a continuous circuit of operations. In an ideal configuration, an empty instance of the cartridge 100 is directly conveyed from the reconditioning platform to the load platform, where the cartridge 100 receives the volume of construction material 108. The load manipulator is then able to directly acquire and convey the cartridge 100 and the volume of construction material 108 to the deployment platform for use as part of the programmed deposition process without traversing the reconditioning platform. Once expended, the cartridge 100 may again be acquired with the load manipulator and conveyed back to the reconditioning platform for preparation and inspection before reentering circulation. This arrangement prevents the load manipulator from operating in 'reverse' against the process flow direction, thus minimizing the potential for successive loads to obstruct each other. Further, at least one load manipulator may be configured to sequentially service each platform by depositing the cartridge 100 at any arbitrary platform, then advancing to service the next in-series platform and the instance of the cartridge 100 therein. This minimized idle-time for the load manipulator, as there is always at least one instance of the cartridge 100 ready to be advanced to the next platform in series.

The reconditioning platform constitutes a secured area suitable for accessing the interior of the cartridge 100, including removal or displacement of the piston 105 and the forming device 103 to access the interior of the cartridge 100 unobstructed. The reconditioning platform may further be equipped with a rotary brush or other comparable cleaning assembly, such that the cartridge 100 may be scoured longitudinally with the piston 105 and forming device 103 displaced. Further, the reconditioning station is ideally configured as a lockout booth or cell, such that a direct inspection of the cartridge 100 and associated components may be examined for damage or malfunction between use-cycles. This inspection may be accomplished by personnel reporting to the unitary controller 106, relayed from distributed sensors, or any combination thereof without departing from the original spirit and scope of the present invention.

The fill platform constitutes any zone, cradle, or carriage that may be utilized to dispose the volume of construction material 108 into the cartridge 100, ideally being a linear conveyor belt leading from a nearby mixing cell or other equivalent admixture preparation mechanism. It is further considered that the loading platform provides a means of placing the piston 105 onto the volume of construction material 108 once loaded, effectively capping the cartridge 100 to minimize exposure of the volume of construction material 108 to external contaminants. The piston 105 does not necessarily require compression into the cartridge 100 to create a functional seal to the cartridge 100, but it is considered that in at least one embodiment that the plunger assembly 102 may be employed to seat the piston 105. This process will generally extrude or otherwise dispense a portion of the volume of construction material 108 as the cartridge 100 is evacuated of voids and air-bubbles, effectively 'priming' the cartridge 100 for use. Consequently, the sacrificial extrusion of the volume of construction material 108 through the forming device 103 ensures that the first segment of the programmed deposition process will emerge without any gaps, stutters, or captive debris.

The deployment platform constitutes a means of receiving and supporting the loaded cartridge 100 such that the plunger assembly 102 is indexable onto the longitudinal axis of the cartridge 100. More specifically, the deployment platform provides a means of transferring the cartridge 100 from the loading assembly 104 into the working area where the volume of construction material 108 is to be dispensed. The deployment platform is further considered to constitute any necessary operable mechanisms required to convey the loaded cartridge 100 onto a suitable motion control assembly, or other external construction vehicle, such that the cartridge 100 is fully under the control of the motion control assembly for the duration of the programmed deposition process. In one embodiment, the deployment platform is provided with a lifting mechanism or other similar operable element to elevate the cartridge 100 into a suitable pickup location for an external vehicle to capture and remove cartridge 100. This transfer may be further augmented by a series of releasable locks distributed between the deployment platform, the cartridge 100, and the external vehicle. With this arrangement, a controlled 'handoff' is executed by disengaging the locks from the deployment platform, simultaneously engaging the locks between the cartridge 100 and the external vehicle.

The load manipulator constitutes any means of conveying the cartridge 100 between each discrete station, thereby enabling the sequential preparation of the cartridge 100, the forming device 103, the volume of construction material 108, and the piston 105 to form a single deployable instance of the present invention. In one embodiment the load manipulator is a centrally positioned serial arm robot of suitable capacity and range to convey a fully-loaded cartridge 100 between any of the serially-arranged platforms.

A preferred method for operation the present invention begins by providing an instance of the cartridge 100, the forming device 103, the piston 105, and the plunger assembly 102 (Step A) in the operable configuration outlined above.

Figure 3:
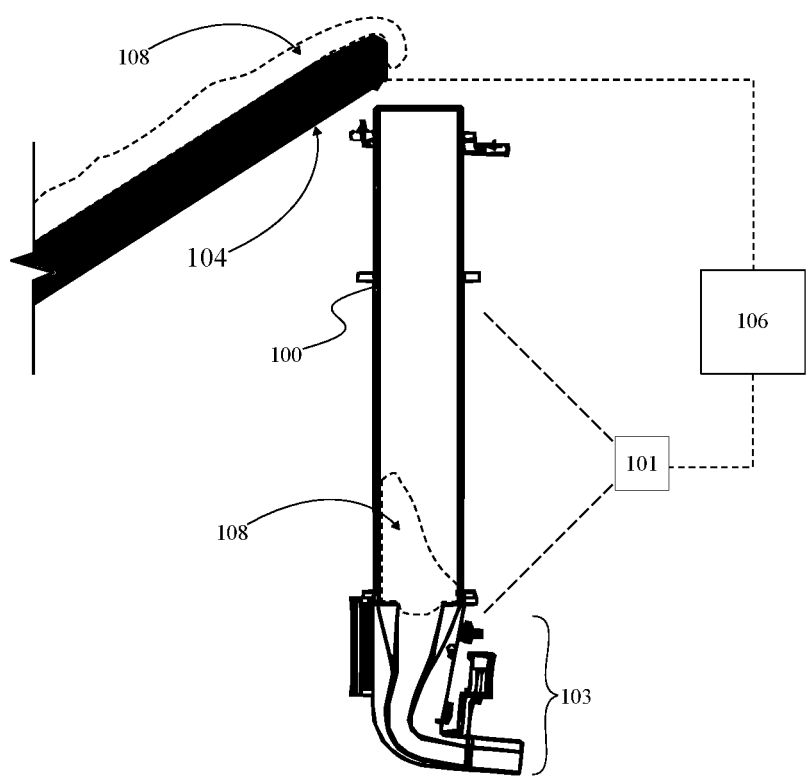
FIG. 3 is an elevational cross-section view of the present invention based on the arrangement in FIG. 2, where the volume of construction material is shown being loaded into the cartridge via the loading assembly.

In reference to FIG. 3, the volume of construction material 108 is then positioned into the cartridge 100 using the loading assembly 104 (Step B) until a desired mass, volume, or pressurized content limit is attained. The automation of the loading process provides a repeatable, controlled basis for corrections to be made to the admixture as successive generations of the volume of construction material 108 are dispensed.

Figure 4:
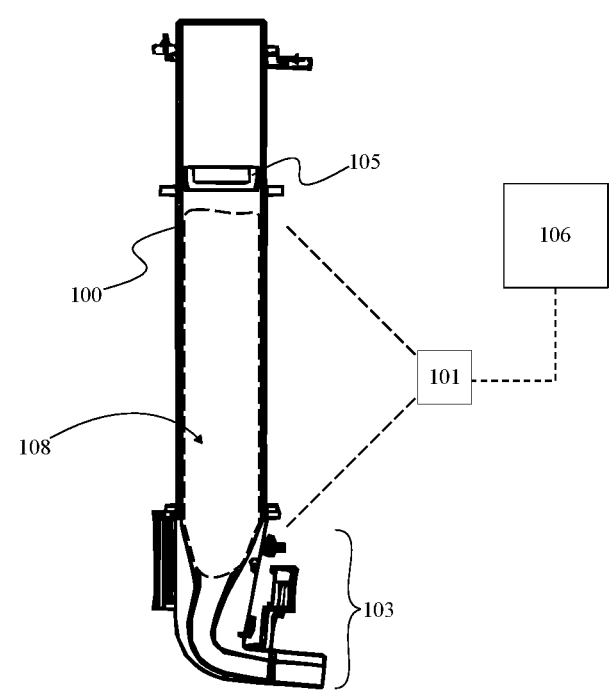
FIG. 4 is an elevational cross-section view of the present invention, where a piston is shown inserted into the cartridge behind the volume of construction material.

The process continues by positioning the piston 105 onto the volume of construction material 108 within the cartridge 100 such that the material is constrained between the forming device 103 and the piston 105 (Step C) as illustrated in FIG. 4. During this stage of the process, the cartridge 100 is ideally made into a singular, sealed unit suitable for transport and storage for later use, dependent on the working-time of the volume of construction material 108 loaded therein. This functionality may be further enabled by operating the forming device 103 as an outflow check-valve against the volume of construction material 108. Consequently, the piston 105 is retained within the cartridge 100 as the negative pressure prevents movement of the piston 105 to the rear of the cartridge 100.

Figure 5:
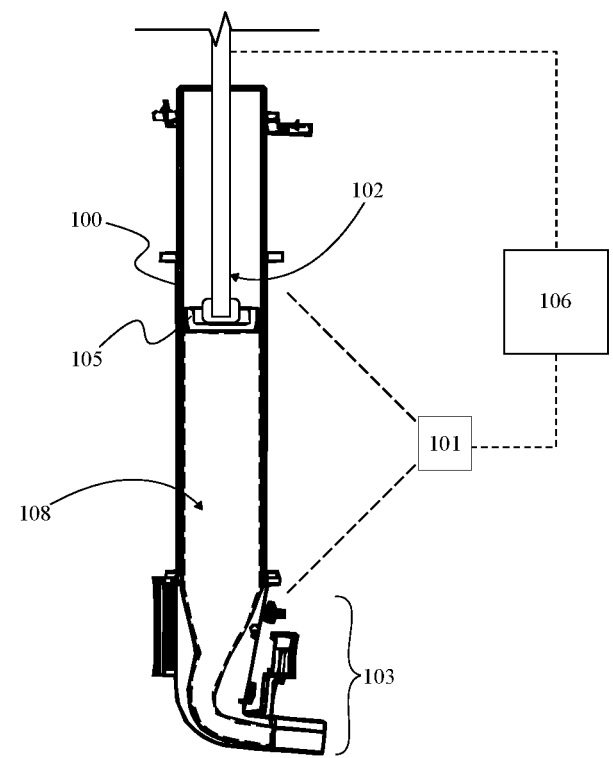
FIG. 5 is an elevational cross-section view of the present invention, where a plunger assembly is shown positioned into the cartridge and engaged with the piston.

In reference to FIG. 5, the process continues by engaging the cartridge 100 to the plunger assembly 102, such that the plunger assembly 102 moderates the position of the piston 105 along the cartridge 100 (Step D). This further enables operable control of the piston 105 to precisely distribute the volume of construction material 108. More specifically, the plunger assembly 102 may be employed to advance the piston 105 to any given depth within the cartridge 100 to dispense a corresponding amount of the volume of construction material 108. The precise amount of dispensation may be derived from the reduction in internal volume of the cartridge 100, based on the known internal diameter of the cartridge 100 and the displacement between the piston 105 and the forming device 103. The derived value for material-remaining may be referenced to inform an operator that a reload in necessary, to track expenditure for inventory-control, and to make each deposition uniform according to the programmed plan.

Figure 6:
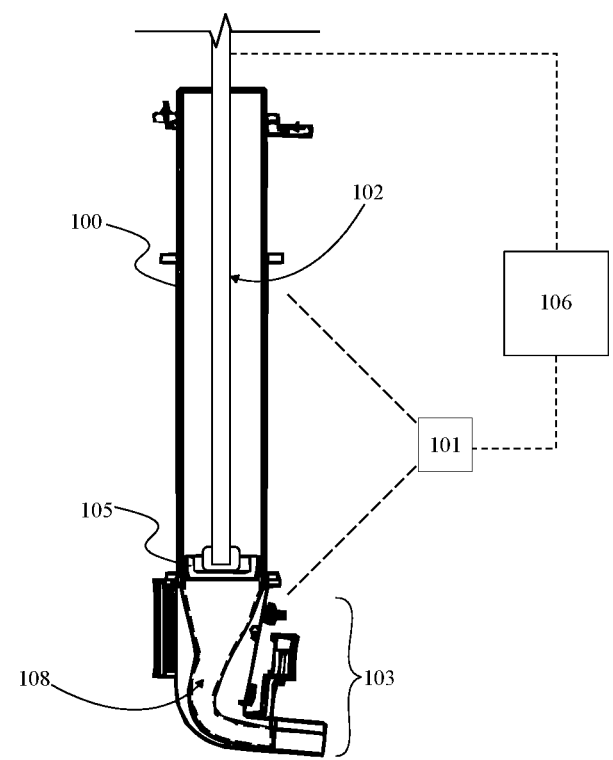
FIG. 6 an elevational cross-section view of the present invention, where the plunger assembly is shown advanced to the end of the cartridge such that the piston is impinging upon the forming device.

As shown in FIG. 6, the process continues by displacing the piston 105 along the cartridge 100 with the plunger assembly 102 such that a purging charge from the volume of construction material 108 is ejected from the forming device 103 (Step E). The purging charge constitutes a sacrificial portion of the payload of any given cartridge 100 that generally contains a plurality of the debris, voids, bubbles, and insolvent additives that are known to accumulate at the bottom of the cartridge 100. Further, the portion of the volume of construction material 108 that remains within the forming device 103 behind the purging charge is ideally conformant to the interior dimensions of the forming device 103, thus ensuring that the next segment of the volume of construction material 108 is accurate to the forming device 103.

The process continues by releasing the cartridge 100 to a motion control system to execute a programmed deposition process (Step F), such that the volume of construction material 108 within the cartridge 100 is expended into a working area according to control signals received from the unitary controller 106. As previously outlined, the motion control system may constitute any type or variety of vehicle suitable for conveying the loaded cartridge 100 to and from the loading assembly 104. In an ideal embodiment, the loading assembly 104 is positioned within the working volume of a gantry system configured to precisely dispense the volume of construction material 108 as part of an automated additive construction process. The construction process may extend between initial land preparation, slab formation, wall structuration, and finish application in at least one embodiment, including various embodiments of the cartridge 100 and volume of construction material 108 to support each distinct process.

This process is recursive to enable continuous construction operations, ideally recycling each spent instance of the cartridge 100 for reloading through the loading assembly 104. Accordingly, the process extends indefinitely by executing a plurality of iterations for steps (B) through (F), wherein the cartridge 100, the forming device 103, and the piston 105 are exchanged during step (B) (Step G).

A subprocess for the above-defined method is provided to determine the bulk density of each loaded instance of the loaded cartridge 100. The subprocess begins by capturing a combined dry weight of the cartridge 100, the forming device 103, and the piston 105 after step (A), creating a baseline value for the mass of each discrete instance of the loaded cartridge 100 absent the volume of construction material 108. An internal volume of the cartridge 100 between the piston 105 and the forming device 103 is then derived during step (E), providing the actual space occupied within the cartridge 100 by the volume of construction material 108. A loaded weight is then captured of the cartridge 100, the forming device 103, the piston 105, and the volume of construction material 108 after step (E). This loaded value is estimated to represent the entire unit-mass of each loaded instance of the cartridge 100 and may be captured by any mechanism or structure configured to convey the cartridge 100 between operating areas, or directly from the loading assembly 104 during the loading process. The subprocess concludes by deducting the dry weight and from the loaded weight to determine a net weight and dividing the net weight by the internal volume to determine the bulk density of the volume of construction material 108 using the unitary controller 106.

It is further considered that variants of the volume of construction material 108, particularly cementitious materials, may begin the curing process while still housed in the cartridge 100. To prevent premature setting in the cartridge 100, a subprocess is provided wherein the cartridge 100 is engaged to an agitator device after step (B). The agitator device constitutes any means of disturbing and remixing the volume of construction material 108 inside the cartridge 100. In one embodiment, the agitator device may define a rotating auger or similar rotary tool introduced to the cartridge 100 directly. In another embodiment, the agitator device is an array of vibratory motors exposed to the exterior of the cartridge 100 to agitate the volume of construction material 108 indirectly. Further, the array of vibratory motors may include a means of generating ultrasonic waves to pulverize any large debris or aggregate in the volume of construction material 108 without decanting the cartridge 100. The subprocess concludes by uniformly distributing the volume of construction material 108 within the cartridge 100 using the agitator device during step (C). Uniform distribution ideally prevents material clumping from impeding the effective distribution of the volume of construction material 108, delaying the formation of unpassable masses within the cartridge 100. Additionally, it is considered that a uniform distribution of the admixed components prevents the separation of any reagents within the volume of construction material 108.

Another subprocess is provided to enable the rapid reconditioning of the spent cartridge 100s retrieved from the working area. This is accomplished by overextending the plunger assembly 102 to clear the piston 105 and any remaining volume of construction material 108 from the cartridge 100. The subprocess begins by retrieving the cartridge 100 from the motion control assembly with a load manipulator after step (F), such that the cartridge 100 is conveyed to a location suitable for disposing leftover amounts of the volume of construction material 108 therein.

Figure 7:
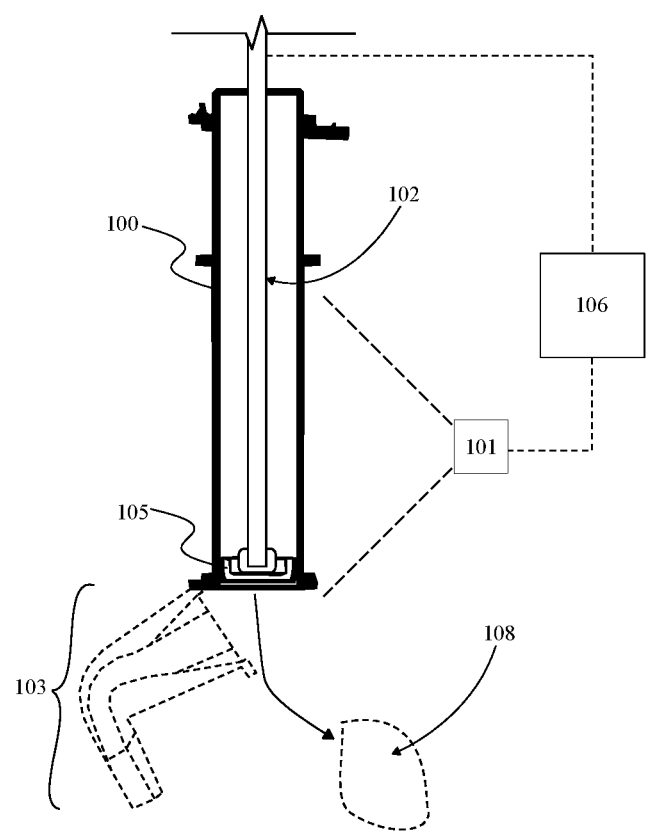
FIG. 7 an elevational cross-section view of the present invention, where the forming device is shown displaced from the terminal end of the cartridge and opened, the volume of construction material therein being ejected as wastage.
Figure 8:
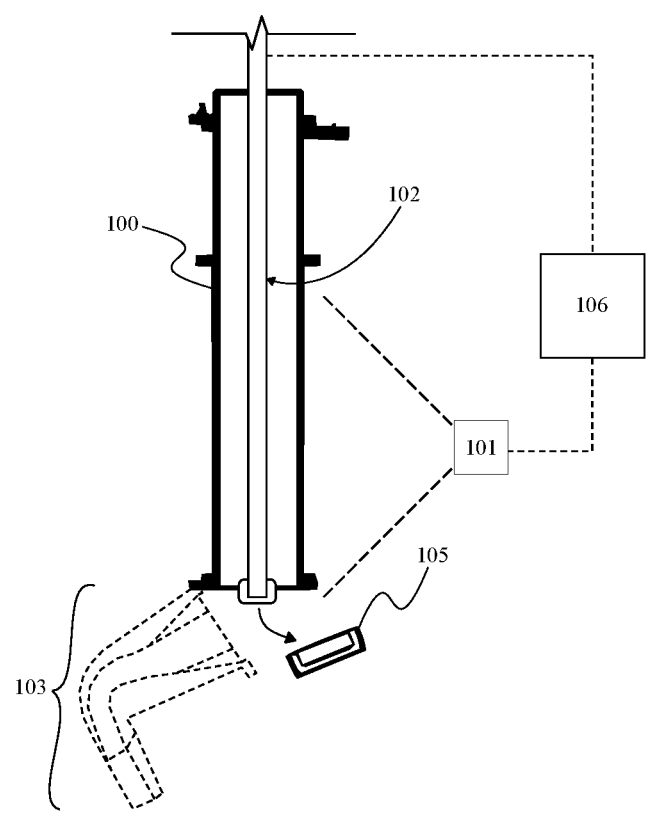
FIG. 8 is an elevational cross-section view of the present invention, where the plunger assembly is shown over-extended into the region previously occupied by the forming device such that the piston is ejected from the cartridge.

In reference to FIG. 7, the forming device 103 is then displaced from the cartridge 100, ideally by separating the forming device 103 laterally to expose the full internal flow-path to enable thorough cleaning. In another embodiment, the forming device 103 may be removed from the cartridge 100 entirely to enable the forming device 103 to be cleaned separately. This embodiment additionally enables alternate variants of the forming device 103 to be interchanged onto the cartridge 100 to output different mixtures or shapes of the volume of construction material 108 in the next use cycle. The subprocess continues by ejecting the piston 105 and any debris from the cartridge 100 using the plunger assembly 102, ideally by overextending the plunger assembly 102 into the region formerly occupied by the forming device 103 as shown in FIG. 8. The piston 105 effectively serves as a honing tool for the interior surfaces of the cartridge 100 during this operation by scraping any unused portions of the volume of construction material 108 from the cartridge 100 as the piston 105 is forced out of the exposed terminal end of the cartridge 100. The subprocess concludes and reiterates by recirculating the cartridge 100, the forming device 103, and the piston 105 during step (B). This process serves to continuously supply useable instances of the functional components of the present invention for reload and reapplication as part of the programmed deposition process under control of the motion control assembly.

Although the invention has been explained in relation to its preferred embodiment and best-method, including several branching permutations thereof, it is to be understood that many other possible modifications and variations can be made without departing from the original spirit and scope of the present invention.

The invention claimed is:

1. An apparatus comprising:
a cartridge configured to receive a volume of construction material;
a piston being operable within the cartridge, moderated by at least one plunger assembly;
a forming device being terminally connected to the cartridge, opposite the piston across the volume of construction material;
a loading assembly configured to receive the cartridge and sequentially insert the volume of construction material and the piston opposite the forming device along the cartridge;
at least one sensor package being oriented towards the cartridge, such that at least one condition datum from the volume of construction material therein is derived;
a unitary controller being connected to the sensor package, the plunger assembly, and the loading assembly such that the unitary controller supplies control signals to the plunger assembly and the loading assembly based on the condition datum;
a target material value characterized by deterministic input to the unitary controller;
at least one stored material value being characterized by the condition datum corresponding to expended material previously deployed from the cartridge;
a current material value being characterized by the condition datum corresponding to material positioned within the cartridge;
the current material value being compared to at least one stored material value using the unitary controller, such that a material value projection is derived as a trend line therebetween; and
the current material value being adjusted to intersect the material value projection with the target material value.

2. The apparatus of claim 1 further comprising:
the target material value being a minimum load value characterized by the required volume of construction material necessary to complete a programmed deposition process;
the stored material value being characterized by the recorded expenditure of the volume of the arbitrary volume of construction material; and
the current material value being characterized by the mass of the current volume of construction material.

3. The apparatus of claim 1 further comprising:
the target material value being a material cure-time characterized by the interval between the insertion of the volume of construction material into the cartridge and the completion of a programmed deposition process therewith;
the stored material value being characterized by the maximal working-time of the arbitrary volume of construction material; and
the current material value being characterized by a catalyst additive value positively corresponding to the cure rate of the current volume of construction material.

4. The apparatus of claim 1 further comprising:
the target material value being an optimum mixture value characterized by the preferred moisture content in current ambient conditions for depositing the volume of construction material via a programmed deposition process;
the stored material value being characterized by the moisture content of the arbitrary volume of construction material disposed through the forming device; and
the current material value being characterized by the moisture content of the current volume of construction material within the cartridge.

5. The apparatus of claim 1 further comprising:
the loading assembly comprising a reconditioning platform, a fill platform, a deployment platform distributed within the operational range of at least one load manipulator; and
the fill platform being positioned between the reconditioning platform and the deployment platform such that the load manipulator circuitously conveys the cartridge between the reconditioning platform, the load platform, the deployment platform, and the reconditioning platform.

* * * * *